(12) United States Patent
Johnson

(10) Patent No.: US 9,266,085 B2
(45) Date of Patent: Feb. 23, 2016

(54) JOHNSON AMBIENT-HEAT ENGINE

(75) Inventor: Lonnie G. Johnson, Atlanta, GA (US)

(73) Assignee: Johnson Research & Development Co. Inc., Atlanta, GA (US)

( * ) Notice: Subject to any disclaimer, the term of this patent is extended or adjusted under 35 U.S.C. 154(b) by 951 days.

(21) Appl. No.: 12/878,397

(22) Filed: Sep. 9, 2010

(65) Prior Publication Data

US 2012/0064419 A1 Mar. 15, 2012

(51) Int. Cl.
| | |
|---|---|
| *H01M 2/08* | (2006.01) |
| *B01J 19/08* | (2006.01) |
| *H01M 8/04* | (2006.01) |
| *H01M 8/06* | (2006.01) |

(52) U.S. Cl.
CPC .......... *B01J 19/088* (2013.01); *H01M 8/04104* (2013.01); *H01M 8/04208* (2013.01); *H01M 8/04216* (2013.01); *H01M 8/04365* (2013.01); *H01M 8/04388* (2013.01); *H01M 8/04552* (2013.01); *H01M 8/04955* (2013.01); *H01M 8/065* (2013.01); *B01J 2219/0805* (2013.01); *Y02E 60/50* (2013.01)

(58) Field of Classification Search
CPC ...................... H01M 8/04104; H01M 8/04208
USPC .................................................. 429/421, 408
See application file for complete search history.

(56) References Cited

U.S. PATENT DOCUMENTS

| | | | | |
|---|---|---|---|---|
| 4,402,817 | A | * | 9/1983 | Maget ........................... 204/265 |
| 5,417,822 | A | * | 5/1995 | Maget ........................... 205/783 |
| 6,099,708 | A | * | 8/2000 | Mallory et al. ............... 204/412 |
| 6,899,967 | B2 | | 5/2005 | Johnson |

\* cited by examiner

*Primary Examiner* — Cynthia H Kelly
*Assistant Examiner* — Monique Wills
(74) *Attorney, Agent, or Firm* — Panitch Schwarze Belisario & Nadel LLP

(57) ABSTRACT

An ambient-heat engine has a substantially thermally-conductive housing whose interior is divided into a high-pressure chamber and a low-pressure chamber by a substantially gas-impermeable barrier. An ionically-conductive, electrical-energy-generating mechanism forms at least a portion of the barrier. First hydrogen-storage medium is disposed within the high-pressure chamber and second hydrogen-storage medium is disposed within the low-pressure chamber. An electrical-energy storage device connected to the ionically-conductive, electrical-energy-generating mechanism is operable between a charge condition and a discharge condition. In a charge condition, hydrogen atoms within the high-pressure chamber are converted to hydrogen ions and conducted through the electrical-energy-generating mechanism to the low-pressure chamber causing electrical-energy to be generated to the electrical-energy storage device. When the electrical-energy storage device is in a discharge condition an electric current is passed through the electrical-energy-generating mechanism causing hydrogen in the low-pressure chamber to convert to hydrogen ions and conduct through the electrical-energy-generating mechanism to the high-pressure chamber.

12 Claims, 8 Drawing Sheets

JOHNSON AMBIENT-HEAT ENGINE

RELATED APPLICATIONS

Not applicable.

STATEMENT REGARDING FEDERALLY-SPONSORED RESEARCH OR DEVELOPMENT

Not applicable.

TECHNICAL FIELD

This invention relates to energy harvesting mechanisms for generating electrical power, and more particularly, the invention relates to a thermo-electrochemical device that utilizes hydrogen to convert heat energy from an environment in which the device is located into electrical power.

BACKGROUND OF THE INVENTION

It has long been a goal to develop an engine that operates on thermal energy that is freely available in the ambient environment. Consistent with the second law of thermodynamics, prior attempts at such thermal-energy-harvesting devices required two distinct sources of thermal energy, namely, a heat source and a heat sink for supplying and removing heat, respectively, at different temperatures simultaneously. A heat-source and heat-sink pair having two distinct, spaced-apart temperatures typically does not occur naturally and/or plentifully, and thus are generally difficult to access. Therefore, because ambient heat at a single atmospheric temperature is more abundant and available than a simultaneous dual-heat source, a device for harnessing single-source ambient heat is more desirable than a device that requires a dual-heat source.

The present inventor disclosed a device in U.S. Pat. No. 6,899,967. That device relies on cyclic temperature changes in the environment to produce the needed simultaneous dual-heat source. The needed temperature difference was provided through the use of a mass of material that has significant heat capacity. The prior device is a thermo-electrochemical converter that operates on a pressure difference between two metal-hydride chambers separated by a membrane electrode assembly (MEA). In the prior invention, one metal-hydride chamber is exposed to the ambient environment while the other is insulated and thermally stabilized. A thermal mass is coupled to the stabilized chamber to act as a heat source/sink material. Insulation may be used to thermally isolate the thermal-mass material from the environment in order to enhance the temperature difference produced. It absorbs heat and stores it during periods of elevated ambient temperature and releases that heat to function as an elevated-temperature heat source during periods of reduced ambient temperatures. As such, changes in the temperature of the thermal mass will always lag temperature changes in its environment. Thus a converter coupled between the thermal mass and the environment will be subjected to a simultaneous temperature differential needed for the device to operate.

The open-circuit electrical potential due to a hydrogen pressure differential across a proton-conductive membrane electrode assembly (MEA) is a linear function of temperature and proportional to the natural logarithm of the hydrogen pressure ratio and can be calculated using the Nernst equation (*Fuel Cell Handbook*, Fourth Edition, 1999, by J. H. Hirschenhofer, D. B. Stauffer, R. R. Engleman, and M. G. Klett, at pp. 2-5:

$$V_{OC} = \overline{R}T/2F \ln(P_{Hi}/P_{Low}) \qquad \text{Equation 1}$$

where $V_{OC}$ is open circuit voltage, R is the universal gas constant, T is the cell absolute temperature in degrees Kelvin, F is Faraday's constant, $P_{Hi}$ is the hydrogen pressure on the high-pressure side and $P_{Low}$ is the hydrogen pressure on the low-pressure side.

The hydrogen pressure produced by a metal-hydride bed depends on temperature. When the ambient metal-hydride chamber is at a higher temperature, $H_2$ gas is desorbed from its metal hydride content and flows through the MEA into the thermally stabilized chamber, thus generating power. During the next half cycle, when the temperature of the ambient chamber falls below the temperature of the insulated chamber, the opposite takes place, hydrogen flows through the MEA back to the ambient temperature chamber. Hydrogen thus cycles back and forth under a pressure differential across the proton-conductive membrane generating power in the process.

A major limitation encountered with the prior invention is associated with the need to have a device that is capable of scavenging power in a relatively efficient manner. A major limitation in achieving efficient operation is associated with the difficulty of creating a significant temperature difference between components. This is particularly true for a small device. The close proximity of the components in a small device allows parasitic heat transfer losses between the two metal-hydride beds that are too high whenever a significant temperature gradient is present. In larger devices, the need for insulation and heat sink/source material can result in a large, bulky device that is difficult to implement. Thus it can be appreciated that a need remains for a device for producing electrical power using heat from its ambient environment that overcomes the disadvantages and shortcomings of previous chemical and thermal converters that need a simultaneous temperature difference in order to operate.

SUMMARY OF THE INVENTION

According to an embodiment of the present invention, an electrochemical conversion system has a thermally-conductive housing. The interior of the housing is divided into a high-pressure chamber and a low-pressure chamber by a substantially gas-impermeable membrane. An ionically-conductive, electrical-energy-generating mechanism forms at least a portion of the substantially gas-impermeable membrane. A first hydrogen-storage medium is disposed within the high-pressure chamber. A second hydrogen-storage medium is disposed within the low-pressure chamber. The characteristics of the hydrogen-storage mediums are such that at any given temperature, the first hydrogen-storage medium stores hydrogen at a first average storage pressure that is higher than a second average storage pressure at which the second hydrogen-storage medium stores hydrogen. The housing contains an initial quantity of hydrogen. An electrical-energy storage device connected to the ionically-conductive, electrical-energy-generating mechanism is selectively operable between a charge condition and a discharge condition.

The Johnson Ambient-Heat Engine (JAHE) (an electrochemical conversion system) uses thermal transients that naturally occur in its ambient environment to generate electrical power. During selected periods of high temperature, the electrochemical conversion system naturally produces a high voltage output for a given pressure ratio between the high-pressure and low-pressure chambers. The electrical-energy storage device is charged by allowing hydrogen to expand from the high-pressure chamber into the low-pressure chamber during periods of high temperature and thereby high voltage. Conversely, the electrochemical conversion system produces low voltage during periods of low temperature. The electrical-energy storage device is discharged during selected low voltage periods to compress hydrogen from the low-pressure chamber back into the high-pressure chamber. Given two electrons per hydrogen molecule, returning the hydrogen to the high-pressure chamber requires the same amount of current as that generated when it transitioned to the low-pressure chamber. However, less energy is required since the hydrogen is returned during periods when the voltage of the electrochemical conversion system is low. The difference in energy produced during high-temperature expansion versus low temperature-compression is retained within the electrical-energy storage device and is available for supply to an external load.

DETAILED DESCRIPTION

Figure 1:
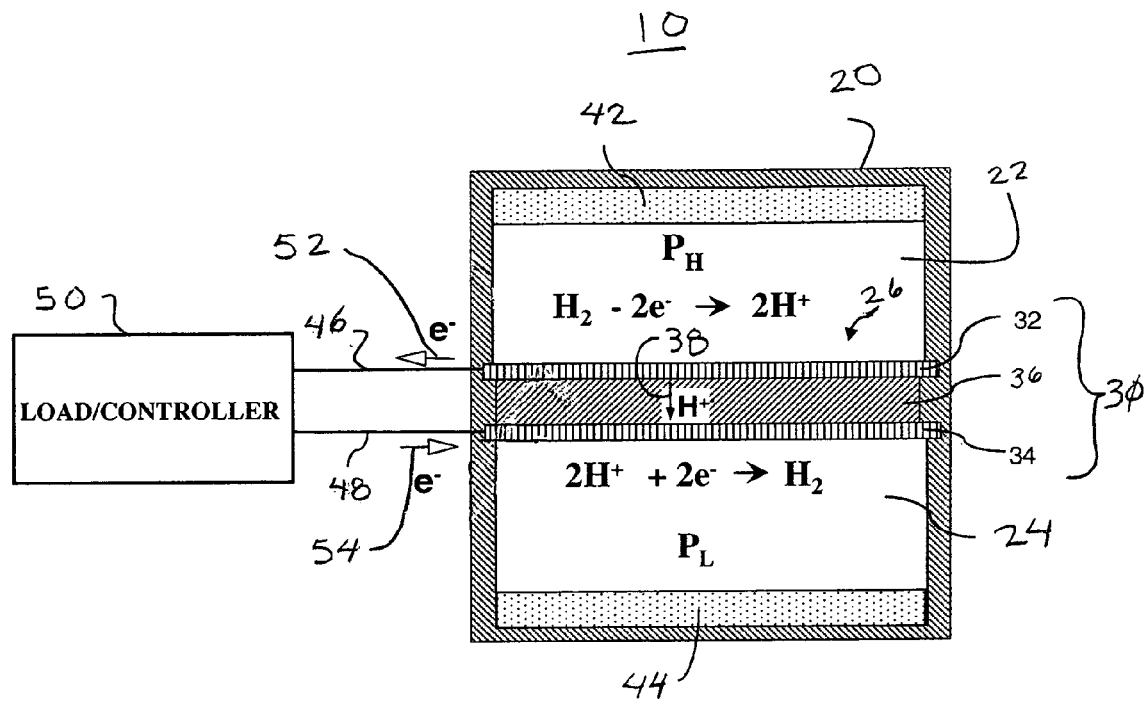
FIG. 1 is a schematic illustration of an electrochemical conversion system in accordance with an embodiment of the invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

Overview

As an overview, the invention teaches a system and methodology for generating electrical energy, which electrical energy can be applied to devices requiring electric power. The concept and overall embodiments of the invention are referred to herein generally as the Johnson Ambient-Heat Engine. The Johnson Ambient-Heat Engine is an apparatus that is powered by thermal transients in its environment. It utilizes thermodynamic principles of heat engines and electrochemical-cell principles in combination to generate electrical energy.

The apparatus performs through a combination of a thermodynamic processes and complementary electrochemical reactions. The phrase electrochemical conversion system will be used throughout this description and claims to generally refer to the invention. The invention also may be considered an "energy harvester," and more particularly may be considered a "thermal energy harvester." Thus the invention as described and claimed herein may be referred to alternatively as the Johnson Ambient-Heat Engine, an electrochemical conversion system and an energy harvester.

Invention Described in Detail

Referring now to the drawings, wherein like numerals indicate like elements throughout the several views, the drawings illustrate certain of the various aspects of exemplary embodiments.

Referring first to FIG. 1, therein is illustrated a schematic representation of an electrochemical conversion system 10 in accordance with an embodiment of the invention. A thermally-conductive housing 20 encloses a high-pressure chamber 22 and a low-pressure chamber 24 that are separated from one another by a substantially gas-impermeable barrier 26. An ionically-conductive, electrical-energy-generating mechanism forms at least a portion of the substantially gas-impermeable barrier 26. In the basic embodiment of FIG. 1, the entire barrier 26 is formed of an ionically-conductive, electrical-energy-generating mechanism. The central component of the ionically-conductive, electrical-energy-generating mechanism is an electrochemical cell 30 formed of electrodes 32, 34 that sandwich an electrolyte medium 36. The electrolyte medium is substantially impermeable. The key elements of the electrochemical cell, namely, electrodes 32, 34 and an electrolyte medium 36, may be referred to as a Membrane-Electrode Assembly (MEA) 30. There may be more than one cell, or MEA, however, in the embodiment illustrated in FIG. 1, a single cell (or MEA) forms the substantially impermeable barrier.

When the electrolyte medium 36 is a proton-conductive membrane, a first hydrogen-storage medium 42 is disposed within the high-pressure chamber 22. A second hydrogen-storage medium 44 is disposed within the low-pressure chamber 24. In a closed volume, as in the chambers of the invention, the hydrogen gas will attain an equilibrium pressure in each chamber which depends on the temperature and the amount of hydrogen contained within the metal-hydride of that respective chamber. The equilibrium pressure of a given metal hydride will vary in accordance with the temperature to which it is subjected. The equilibrium pressure will increase with increases in temperature and decrease with decreases in temperature. Although there is hysteresis, the equilibrium pressure may be considered a tipping point for absorption and desorption of hydrogen. At a given equilibrium pressure, the pressure of hydrogen gas above the equilibrium pressure will cause hydrogen to be absorbed by the hydride and, conversely, hydrogen pressure below the given equilibrium pressure will cause hydrogen to be released (desorbed) by the hydride.

The characteristics of the hydrogen-storage mediums 42, 44 are such that at any given temperature, the first hydrogen-storage medium 42 stores hydrogen at a first average storage pressure that is higher than a second average storage pressure at which the second hydrogen-storage medium 44 stores hydrogen. Effective hydrogen-storage mediums 42, 44 are metal-hydrides (also referred to herein as metal-hydride materials). Thus effective hydrogen-storage mediums are a high-pressure metal-hydride material and a low-pressure metal-hydride material, respectively. The housing 20 contains an initial quantity of hydrogen. A sufficient quantity will have to be aggregated under pressure in the high-pressure chamber 22 to begin the process of generating electrical energy.

Electrical conductors 46, 48 extend from respective electrodes 32, 34 of the MEA 30 (or other electrochemical cell configuration) to complete the electrical circuit that is necessary for operation of the invention. The circuit may be completed by components such as a simple electronic load or a controller system, or a combination of components 50. The invention teaches connection of the MEA 30 (or other cell) to an electrical-energy storage device, such as a capacitor or battery. The electrical-energy storage device is selectively operable between a charge condition and a discharge condition. More particularly, the invention teaches connection of conductors 46, 48 to a rechargeable battery. The load 50 may be a combination of a rechargeable battery and controller system that selectively places the battery component in a charge condition when certain parameters are met and in a discharge condition when other parameters are met.

The chemical reactions that take place in the high-pressure chamber 22 and low-pressure chamber 24, respectively, are written out in the chambers 22, 24 in FIG. 1.

Ideally, the various components comprising the thermo-electrochemical converter, particularly the environment, the housing, high-temperature metal-hydride bed, the MEA and the low-temperature metal-hydride bed are tightly coupled thermally such that all of the components are maintained at or near a single uniform temperature. Ideally, the uniform temperature is the temperature of the environment existing at the time when an expansion or compression event occurs. As a given metal-hydride bed undergoes the endothermic process of releasing hydrogen or exothermic process of absorbing hydrogen, heat is conducted between it and other components so as to maintain the relatively uniform temperature. As hydrogen is compressed or expanded through the MEA heat is removed or supplied respectively so as to maintain the uniform temperature. The thermal energy needed or removed to maintain the temperature of the system (including MEA, cells, hydrides and hydrogen) as hydrogen expands or undergoes compression respectively is thermal energy supplied to or from the environment. It is energy that is conducted through the housing 20 to or from the MEA 36, the high-pressure chamber 22 and low-pressure chamber 24. This thermal energy from the environment is considered "ambient" thermal energy. "Ambient" in this context is considered to mean heat from the environment where the housing is located. In a "local sense," the ambient environment is any enclosure wherein the housing 20 is subjected to the temperature level and temperature transients occurring in the enclosure. Applicable enclosures include but are not limited to a building, a room in a building structure, or a compartment or enclosure in close proximity to a combustion engine. A local ambient environment also encompasses a combustion engine (or other heat-producing instrumentality) itself. The housing 20 may be mounted upon such ambient environment. In a more general sense, the ambient environment may be the atmosphere of the great outdoors wherein thermal energy and temperature transients are provided by the sun.

The materials of the high-pressure and low-pressure beds have been selected such that at any given temperature the storage pressure of the high-pressure storage medium 42 is greater than that of the low-pressure storage medium 44. And, further, because hydrogen is aggregated under pressure in the high-pressure chamber 22, a greater hydrogen pressure will be exerted in the high-pressure chamber 42 than in the low-pressure chamber 24.

The "Load/Controller system" 50 includes a battery or other electrical-energy storage device. When the circuit with the MEA 30 (or other electrical-energy-generating mechanism) is closed electrical power is produced as hydrogen, under pressure and as ions, migrates from the high-pressure chamber to the low-pressure chamber. In the case where the electrical-energy-generating mechanism is a hydrogen conductive MEA, hydrogen undergoes oxidation at the high-pressure electrode 32—electrolyte membrane 36 interface. Electrons are conducted through the circuit as the hydrogen ions (protons) are conducted through electrolyte membrane 36. In the MEA electrode 34 in the low-pressure chamber 24, the hydrogen ions being conducted through the membrane combine with the electrons conducted through the closed circuit to "reconstitute" hydrogen molecules. The hydrogen reconstituted in the low-pressure electrode exits the electrode and becomes substantially absorbed within the second hydrogen-storage medium 44 that is disposed within the low-pressure chamber 24 as the second hydrogen storage medium functions to maintain a low-pressure within the chamber 24.

Hydrogen is returned to the high-pressure chamber 22 from the low-pressure chamber 24 by applying a voltage of sufficient magnitude to reverse the current across the MEA 30 or other electrical-energy-generating mechanism. In this case, hydrogen is conducted from the low-pressure chamber 24 to high-pressure chamber 22. Under the reverse current, electrons are striped from protons in the low-pressure chamber at the low-pressure electrode 34—electrolyte 36 interface and combined with protons in the high-pressure chamber at high pressure electrode 32—electrolyte 36 interface as the protons are conducted through membrane 36. The current and voltage are provided by the capacitor, battery or other electrical-energy storage device.

Figure 2:
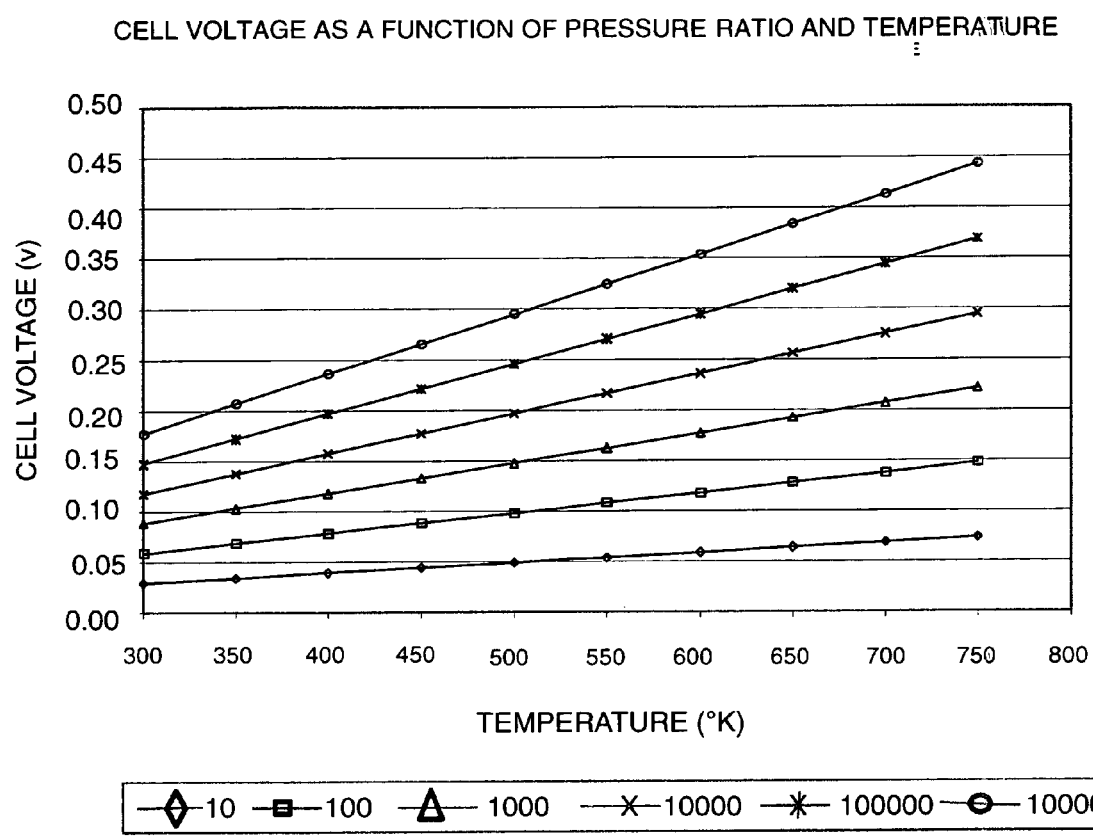
FIG. 2 is a data plot showing the voltage potential of a proton-conductive Membrane-Electrode Assembly (MEA) cell as a function of temperature for selected ranges of hydrogen pressure ratios across the MEA.

FIG. 2 shows the voltage across a proton conductive Membrane Electrode Assembly (MEA) as a function of temperature as calculated using the Nernst equation for selected hydrogen pressure ratios. For a given pressure ratio, the MEA voltage is high when the temperature is high and low when the MEA temperature is low. The controller 50 operates to select charge and discharge events under temperature conditions such that less electrical energy is required to return hydrogen to the high-pressure chamber than is produced to charge the battery. The difference between voltage generated during high-temperature migration and voltage required to facilitate low-temperature migration is useable electrical energy that is retained in the electrical-energy storage device.

Figure 3:
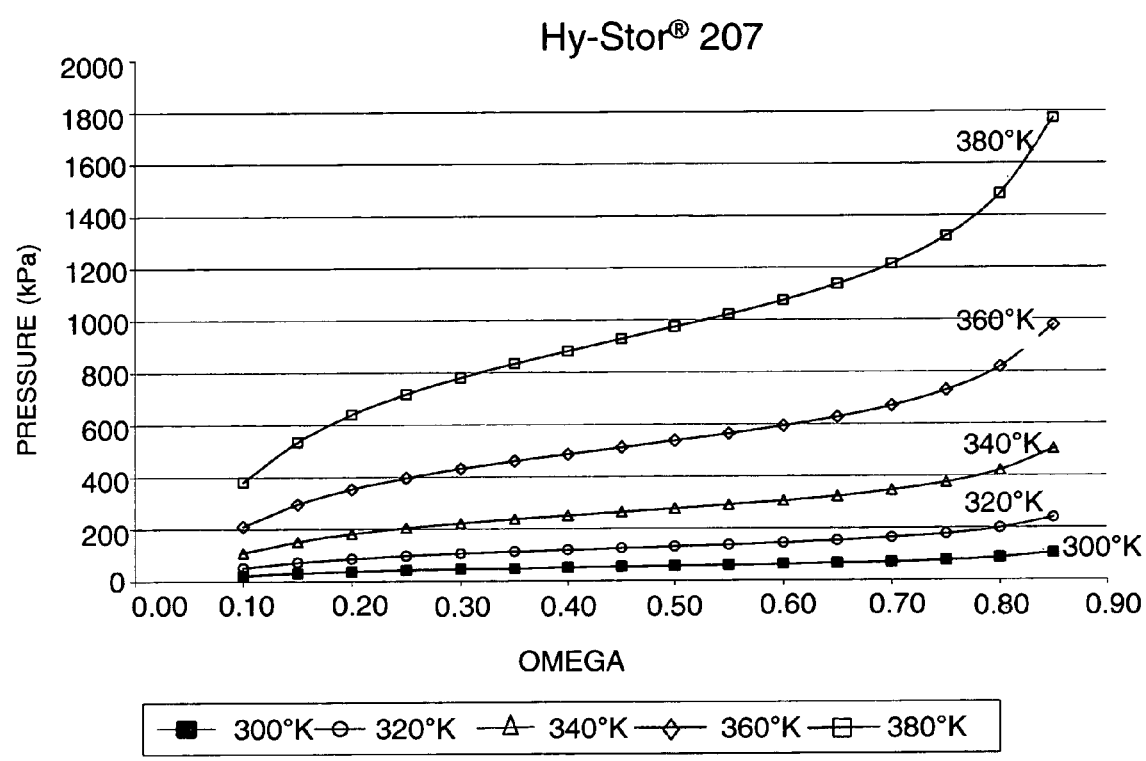
FIG. 3 is a data plot showing hydrogen pressure as a function of hydrogen content for a representative type and brand of metal hydride at selected temperatures.

Referring now to FIG. 3, a data plot shows the pressure and temperature relationship versus hydrogen content for an example metal hydride. This particular chart is for a metal hydride commercially marketed as Hy-Stor® 207 that has a chemical formula $LaNi_{4.7}Al_{0.3}$. The product is believed to be sold and distributed by Hera USA Inc., a Delaware Corporation, having a contact address at C/O Corporation Svc. Company, 2711 Centerville, Road Suite 400 Wilmington Del. 19808. OMEGA, the quantity along the x-axis, is the amount of hydrogen in the metal hydride as a ratio to the maximum amount of hydrogen that the hydride can absorb. As can be seen from the data plot, metal hydrides exhibit pressure plateaus that are a function of temperature whereby, at a given temperature, the majority of the hydrogen is stored with minimal increase in pressure. The pressure level of the plateau increases with increasing temperature. The "midpoint pressure" for a given temperature is defined as the pressure at which the hydride contains 50% (0.50) of its storage capacity. The midpoint pressure may be used as a representative value for comparison of pressures of different hydrogen-ladened metal-hydride materials at a given temperature.

Figure 4:
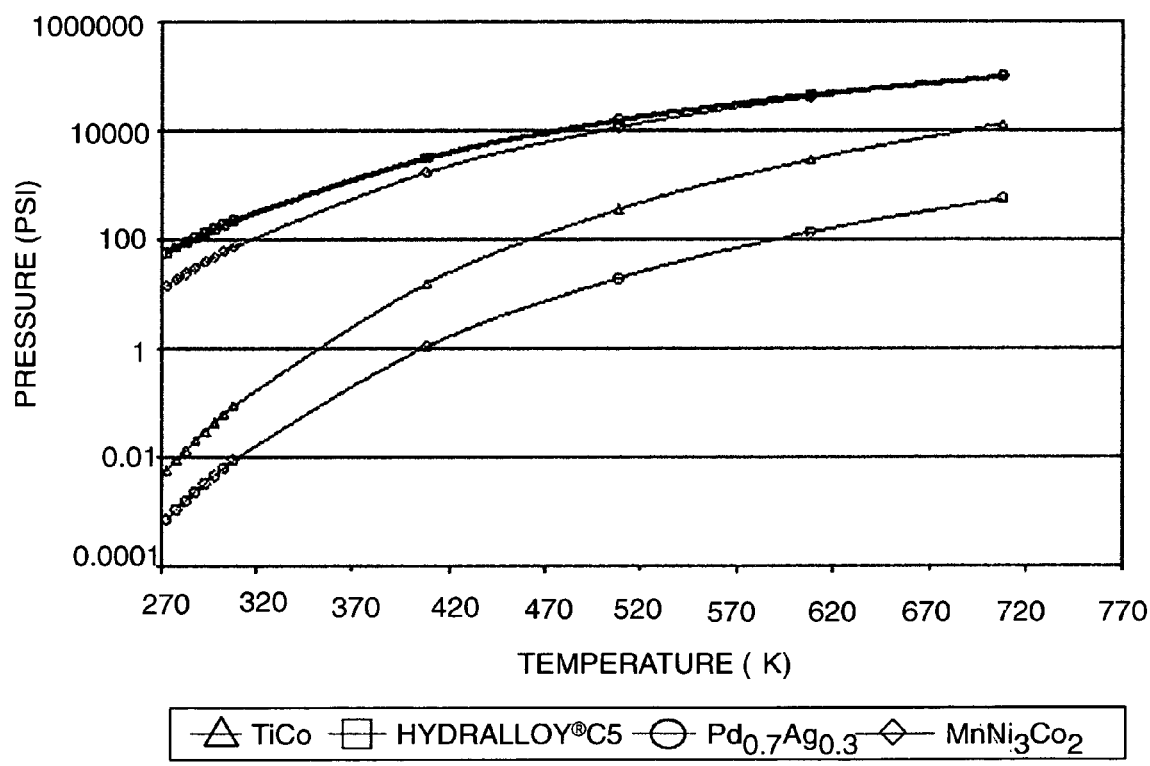
FIG. 4 is a data plot showing midpoint hydrogen pressure as a function of temperature for selected representative metal hydrides suitable for use in of an electrochemical conversion system in accordance with an embodiment of the invention.

Referring now to FIG. 4, therein is shown a plot of the variation of the midpoint pressure versus temperature for several selected commercially available metal hydrides. The name Hydralloy®C5 is a trademark for the metal hydride having chemical formula: $Ti_{0.98}Zr_{0.02}V_{0.43}Fe_{0.09}Cr_{0.05}Mn_{1.5}$. The product is believed to be sold and distributed by GfE Gesellschaft fur Elektrometallurgie mbH Ltd Liab Co, Fed Rep Germany, Hofener Strasse 45, 8500 Nurnberg 1 Fed Rep Germany, a subsidiary of AMG Advanced Metallurgical Group N.V., Netherlands. FIG. 3 highlights the fact that metal hydrides can be selectively paired with each other based on how their midpoint pressures change with temperature. The data provided by the metal hydride suppliers indicate that the midpoint pressures of some of the metal hydrides converge toward each other with increasing temperature (that is, increasing temperature transients) whereas others diverge. Thus selected metal hydrides can be paired together as high-pressure and low-pressure beds for optimum performance in the ambient-heat engine application. The power produced as hydrogen passes from the high-pressure bed to the low-pressure bed through the MEA increases as the pressure ratios between the two beds increase. Similarly, the power required to recompress hydrogen from the low-pressure hydride bed to the high-pressure hydride bed decreases as the pressure ratio decreases. Therefore, higher performance is achieved by the ambient-heat engine for the case where the average pressures of the high- and low-pressure metal-hydride beds diverge with increasing temperature.

Figure 5:
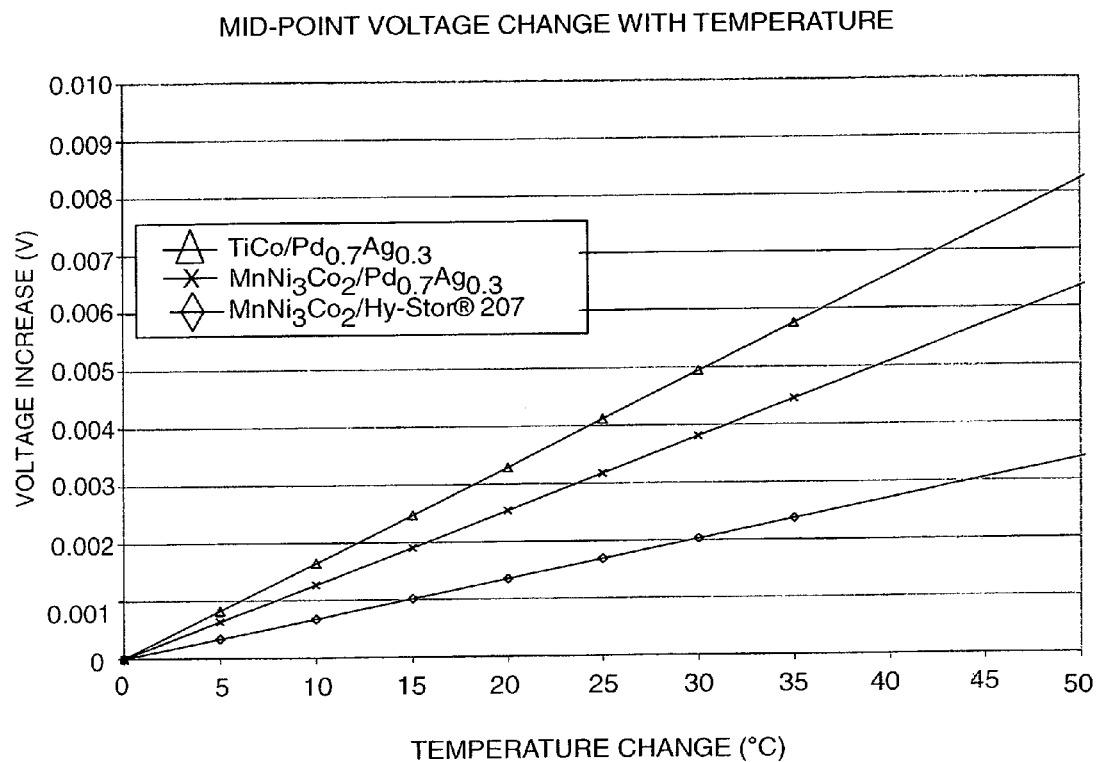
FIG. 5 is a data plot of Nernst voltage change as a function of temperature for three example metal-hydride pairings wherein the metal-hydride pairs are selected based upon predicted, advantageous pressure differentials.

Referring now to FIG. 5, therein is shown a plot of an increase in Nernst voltage versus increase in temperature above a starting temperature of 300 degrees K for three example metal-hydride pairs at their midpoint pressure ratios. The pairs include $MnNi_3Co_2$ paired with Hy-Stor® 207, $MnNi_3Co_2$ paired with $Pd_{0.7}Ag_{0.3}$, and TiCo paired with $Pd_{0.7}Ag_{0.3}$. The change in voltage with change in temperature is greatest for the TiCo and $Pd_{0.7}Ag_{0.3}$ pair.

Figure 6:
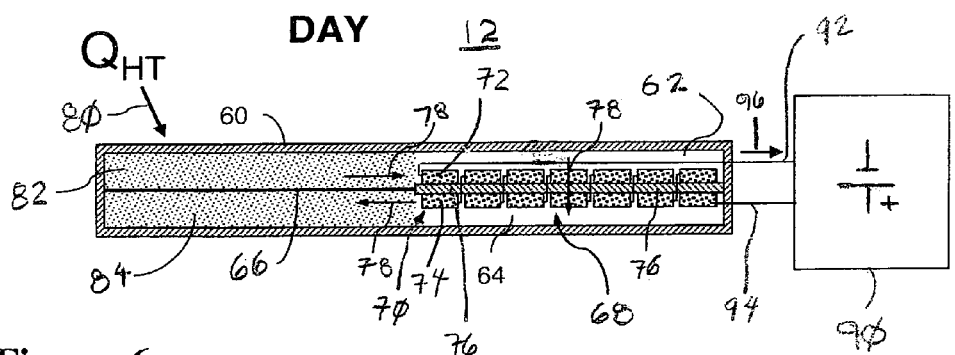
FIG. 6 is a schematic illustration of an electrochemical conversion system in accordance with an embodiment of the invention depicting high/low-temperature operation at high ambient temperature.
Figure 7:
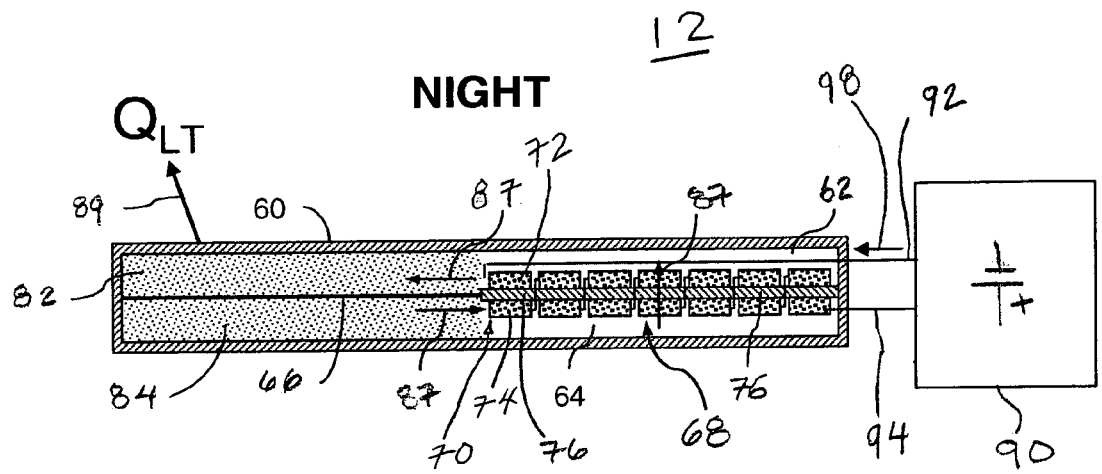
FIG. 7 is a schematic illustration of an electrochemical conversion system in accordance with an embodiment of the invention depicting high/low-temperature operation at low ambient temperature.
Figure 8:
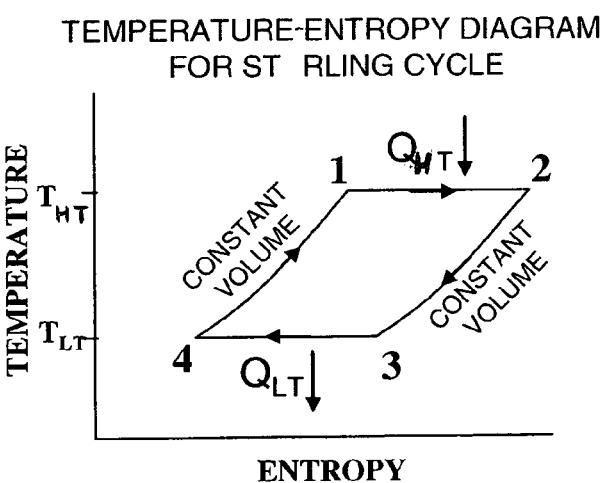
FIG. 8 is a Temperature-Entropy diagram representing ideal operation of an electrochemical conversion system in accordance with embodiments of the invention, viewed as an Ambient-Heat Engine operating on a Sterling thermodynamic cycle.

Referring now simultaneously to FIGS. 6, 7 and 8, these figures illustrate ideal operation of an ambient-heat engine (electrochemical conversion system) 12 in accordance with an embodiment of the present invention. The term ambient-heat engine as used herein refers to that electrochemical conversion system that has a thermal-heat component as described herein. The engine/system 12 described operates under the same combined thermal and electrochemical principles as the system 10 illustrated in FIG. 1 and discussed above. Like elements operate in the same manner as previously described herein. Referring now particularly to FIGS. 6 and 7, the engine includes a housing 60, heat-conductive baffle 66 and MEA array or stack 68. The baffle 66 and MEA array 68 form a substantially gas-impermeable barrier that separates the housing 60 into a high-pressure chamber 62 and a low-pressure chamber 64. The MEA array 68 is an ionically-conductive, electrical-energy-generating mechanism. Although the ionically-conductive, electrical-energy-generating mechanism 68 could comprise a single electrochemical cell as illustrated and described with respect to FIG. 1, the embodiment of FIGS. 6 and 7 teaches a multiple-cell array or stack in which each cell 70 is a Membrane Electrode Assembly (MEA) comprised of a pair of electrodes 72, 74 and a proton-conductive electrolyte medium 76. The electrodes 72 and 74 are configured on opposite sides of the proton-conductive electrolyte medium 76 such that the medium is sandwiched between the two electrodes. The electrolyte medium 76 may be a single, contiguous, elongated structure or it may be a series of smaller structures placed end-to-end or stacked. Each approach effectively forms a set of multiple membrane electrode assemblies each having an electrolyte layer sandwiched between a pair of opposing electrodes 72, 74. The high-pressure chamber 62 contains first hydrogen-storage medium in the form of a high-pressure metal hydride 82. The electrodes 72, 74 of the multiple cells 70 are connected in series (anode/negative electrode to cathode/positive electrode) to respective conductors 92, 94. The low-pressure chamber 64 contains a second storage medium in the form of low-pressure metal hydride 84. A controller system 90 that includes a combined controller and electrical-energy storage device is electrically coupled to the MEA array 68 through conductors 92, 94. Controller system 90 contains an electrical-energy storage device such as a battery or capacitor.

Referring now also to FIG. 8, the Temperature-Entropy (T-S) diagram of FIG. 8 represents operation of the AHE device illustrated in FIGS. 6 and 7. The indicators $Q_{HT}$ and $Q_{LT}$ denote the high-temperature and low-temperature heat quantities described with respect to the engines/systems illustrated in FIGS. 6 and 7. Beginning at high-temperature, high-pressure State 1, represented in FIG. 6 as "DAY" operation, hydrogen expands to low-pressure state 2 under, ideally, constant-temperature conditions as the engine extracts the needed heat of expansion as heat $Q_{HT}$ from the engine's environment.

When high-temperature heat, denoted as $Q_{HT}$ with direction arrow 80 in FIG. 6, from the engine environment (ambient thermal energy or ambient heat) is available to the engine, the controller system 90 applies a load to the MEA array 68. Electrical current is produced as hydrogen passes from the high-pressure, metal-hydride bed 82 and high-pressure chamber 62 (as $H_2$) through the proton-conductive membrane 76 (as $H^+$) to the low-pressure chamber 64 and low-pressure, metal-hydride bed 84 (as $H_2$) as illustrated by direction arrows 78. Freed electrons flow through the conductor 92 to the electrical-energy storage device (battery) that is part of the controller system 90 in the direction shown by direction arrow 96. Useful electrical energy generated by the engine is stored within an electrical-energy-storage device (battery) that is a part of the combined battery and controller system 90. Hydrogen released from the high-pressure metal-hydride bed, after passing through the MEA by becoming ions $H^+$ and then being reconstituted as hydrogen molecules $H_2$, is absorbed by the low-pressure metal-hydride bed on the low-pressure side of the MEA stack 68.

Referring again to the temperature entropy diagram shown in FIG. 8, once high-temperature, low-pressure State 2 is achieved, operation stops and the engine transitions from State 2 to State 3 (from the elevated temperature conditions depicted in FIG. 6 to the low-temperature state represented in FIG. 7). This temperature change takes place over an interval of time and represents a decrease in ambient temperature. This transition from State 2 to State 3 is essentially a constant volume process with no movement of the hydrogen or change in state during the transition. Ideally, the absorbed hydrogen substantially remains absorbed in the metal-hydride bed on the low-pressure side of the engine.

As depicted in FIG. 7, when the environment reaches a predetermined low temperature as detected and registered by controller system 90, controller system 90 supplies power by means of charged battery to MEA array 68 as illustrated by direction arrow 98 to electronically "pump" hydrogen from the low-pressure side of the engine back to the high-pressure side as illustrated by direction arrows 87. The compression process transitions the engine from State 3 to State 4 of the T-S diagram of FIG. 8. This is, ideally, a constant-temperature compression process as heat of compression $Q_{LT}$ is dissipated to the engine's environment as illustrated by direction arrow 89. The transition from state 4 back to state 1 to complete the cycle is a constant-volume process as the hydrogen remains substantially absorbed in the high-pressure, metal-hydride bed, thus the cycle continues with changes in the temperature of the engine's environment.

As an example, consider a daily thermal environment cycle of 10° C., that is, during a 24-hour period the difference between a high and a low ambient temperature is 10° C. During long thermal transitions such as day-night cycles, even a relatively large engine could have time to come into thermal equilibrium with its environment. Assume an engine, as taught by the invention, that uses the $Pd_{0.7}Ag_{0.3}$ and TiCo metal-hydride pair. Referring back momentarily to FIG. 5, the voltage change for this pair over a temperature change of 10° C. is about 1.6 mV. This value is derived under the condition that the midpoint pressure ratios represent an average of the pressure ratio maintained during transition of the hydrogen between hydride beds. A reasonable hydrogen capacity per unit volume of an average metal hydride is equivalent to about 1.86 Ah/cc in electrons. Assume that the high-pressure and low-pressure chambers each contain 1 cc of metal hydride. Given these conditions, the expansion process occurs at 1.6 mV higher voltage than the compression process thus a difference in energy of 2.98 mWh/cc (that is, 1.86 Ah/cc×1.6 mV). This amount of energy is available for powering an external load. If averaged over a period of 24 hours, the average level of continuous available power would be about 0.124 mW per cubic centimeter (that is, 2.98 mWh/cc/24 h=0.124 mW/cc) of metal hydride.

Given practical implementation constraints, assume an average power output of 0.1 mW/cm³ for this system. Additional thermal cycles result in the generation of additional power. Multiple daily cycles are possible and the controller system may be programmed to anticipate and respond to thermal transients that may be greater than or less than the 10° C. example transient disclosed herein. Consider one possible application wherein a portable electronic device that may be carried on one's person into and out of buildings or other situations that change the engine's thermal environment.

To achieve useful output voltage levels, the MEA may be configured as an array or stack of MEA cells with electrical interconnects connecting the cells in series. A single common membrane for the cells in the array or multiple membranes may be aligned to achieve a desired number of cells and voltage level. The amount of hydrogen cycled back and forth across the MEA stack remains constant on average during operation of the engine. Therefore, the difference in energy is extracted based on a difference in cell voltage between the expansion and compression half cycles of the engine.

Figure 9:
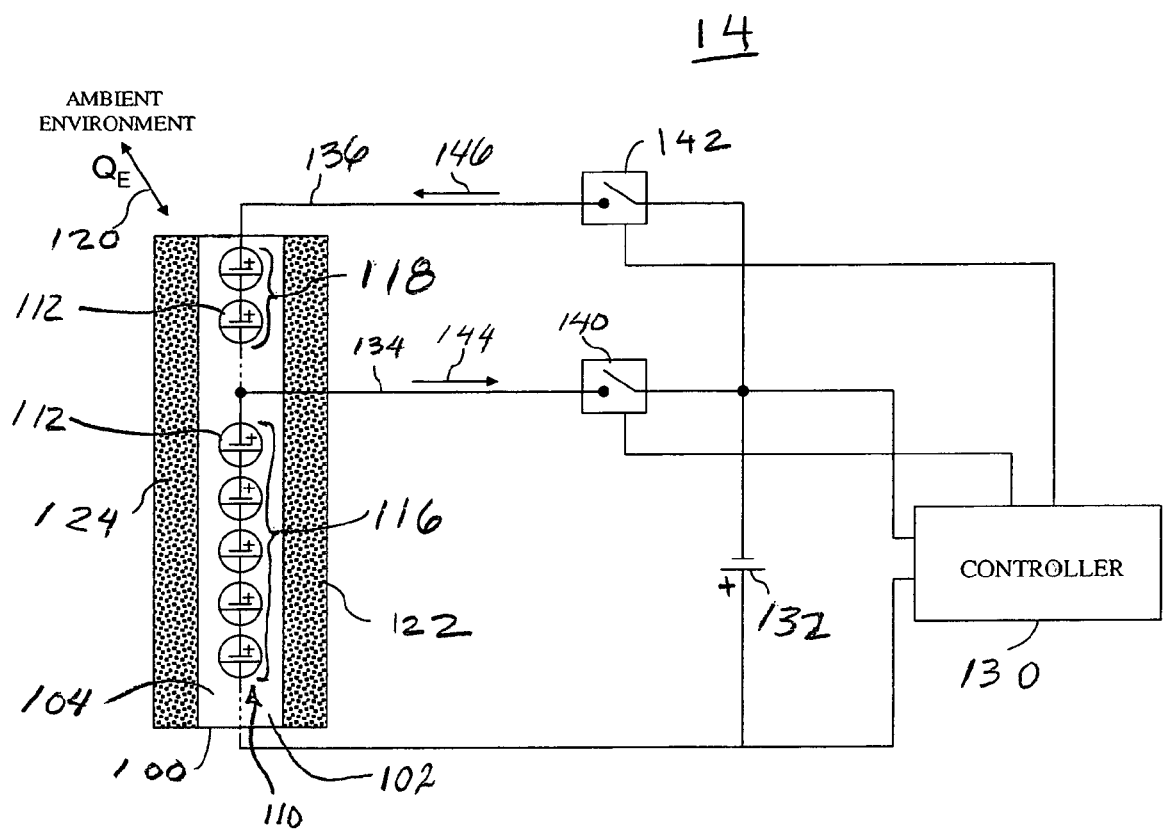
FIG. 9 is a schematic illustration of an electrochemical conversion system in accordance with an embodiment of the invention showing metal-hydride beds, MEA arrays or stacks, battery and controller system under example operating conditions.

Referring now to FIG. 9, therein is illustrated schematically an electrochemical conversion system 14 in accordance with another embodiment of the invention. A thermally-conductive housing 100 is separated into a high-pressure chamber 102 and a low-pressure chamber 104 by a substantially gas-impermeable barrier. Ambient heat of the environment $Q_E$ and heat from within the housing 100 are interchanged through the housing 100, as denoted by the bi-directional arrow 120. As with the systems 10, 12 illustrated and previously described herein, at least a portion of the substantially gas-impermeable barrier comprises an ionically-conductive, electrical-energy-generating mechanism. A particularly suitable ionically-conductive, electrical-energy-generating mechanism is at least one membrane-electrode assembly type of electrochemical cell. The MEA and constituent elements described previously herein are also suitable for use in the embodiment of FIG. 9. As before, the membrane of the MEA provides the substantially gas-impermeable barrier. Somewhat similar to the embodiment of FIGS. 6 and 7, the present embodiment uses multiple MEA's connected in series. For convenience, the illustration of FIG. 9 uses a graphic icon to represent MEA cells. The icon is denoted by the numeral 112 and consists of the symbol for a cell (positive and negative electrode) inscribed within a circle as a symbol for at least one MEA. The icon is also used to represent one or a grouping of more than one MEA. Further, the groupings of the graphic MEA icon 112 are used herein to represent an array, or stack, 110 of individual MEA cells 112. The array, or stack, 110 is comprised of two MEA sub-arrays or stacks 116, 118 with all the individual cells connected in series. One sub-array contains more MEA's than the other. In an example, the array, or stack, 110, comprises 142 MEA cells all connected in series and segmented into a first sub-array 116 of 138 cells and a second sub-array 118 of 4 cells. A first hydrogen-storage medium, in the form of a high-pressure, metal-hydride bed 122 is disposed in the high-pressure chamber 102. A second hydrogen-storage medium, in the form of a low-pressure, metal-hydride bed 124, is disposed in the low-pressure chamber 104. Operation of the arrays is such that the hydrogen passes across the cells uniformly. Since all the cells are connected in series, the current through each and therefore the hydrogen flow across each must be the same. Assuming operation over a 10° C. temperature swing between 20° C. and 30° C. and the $Pd_{0.7}Ag_{0.3}$ and TiCo metal-hydride pair, the Nernst voltage at 20° C. is 0.02762V and at 30° C. is 0.02926V at the midpoint pressures for these materials.

The system 14 further includes controller system 130, battery 132, normally-open charge control switch 140 and normally-open regeneration control switch 142. Operation of the system 14 is such that when the temperature is high, say 30° C., the 138 cells in group 116 produce a voltage of 4.03V (that is, 138 cells×0.02926 V/cell). Output power from MEA array group 116 is supplied at this voltage and controller system 130 closes switch 140 to charge battery 132. The resulting current flow allows hydrogen to expand from high-pressure bed 102 to low-pressure bed 104. Assume that each bed is sized to supply and absorb an amount of hydrogen equivalent to 1.86 Ah of current capacity. The geometry of the system (that is, cells, chambers, etc.) is such that the hydrogen transfer is divided over the number of MEA cells in the stack or array. This alignment results in each cell transferring an amount of hydrogen equivalent to an electrical charge of 13.5 mAh (that is, 1.86 Ah/138 cells). Therefore, 13.5 mAh of charge is supplied to battery 132 at a voltage of 4.03 Volts.

Switch 140 is returned to an open state after charging stops. For battery-charging condition, electric current is dissipated from the larger MEA sub-array 116 through a connector 134 and the closed switch 140 in the direction of the direction arrow 144. When the system is in a discharge-battery configuration, current flows from the battery 132 through closed switch 142 and connector 136 into the full MEA array 110 in the direction shown by direction arrow 146.

Optimally, battery discharge to "recharge" hydrogen in the high-pressure chamber will be effected when the temperature is low, say 20° C. At that temperature, the voltage of the individual cells is reduced to 0.02762V, as given by the Nernst equation. Under this condition, controller system 130 closes switch 142 and thereby connects rechargeable battery 132 in series with the four cells that are in group, or sub-array, 118 and the 138 cells of group, or sub-array, 116. At 20° C., the 142 MEA cells connected in series produce a voltage of only 3.92V (that is, 142 cells×0.02762 V/cell). Conversely, this is the amount of voltage that is necessary to return (or pump) the same quantity of hydrogen back across the membrane(s) at the lower temperature and associated pressure ratio. The battery, having been previously charged to 4.03 volts, now supplies power to the full MEA array 110 to pump hydrogen back from low-pressure bed 124 to high-pressure bed 122. Return of the equivalent of 1.86 Ah of hydrogen to the high-pressure chamber is now divided over 142 cells requiring an application of electrical energy from the battery of only 10.3 mAh (that is, 1.86 Ah/142 cells). In this simple example, 3.1 mAh (that is, 13.5 mAh–10.3 mAh) of residual capacity of electrical energy charge remains available in the battery 132 after the hydrogen has been pumped back to the high-pressure side of the engine. This residual, thus harvested, energy can be used for external applications and the ambient-heat engine is now ready for the follow-on power half cycle.

Charging is initiated after an increasing temperature transient has occurred in the ambient environment. Such charge initiation can be facilitated through use of a sensing system and detector that work in conjunction with the controller system 130 to recognize when charging may be conducted effectively. For example, a temperature sensor may detect the ending, stabilization or leveling off of an increasing temperature transient. If the controller 130 determines that the configuration of the engine and the magnitude of the temperature change are suitable for a charge or discharge event, then it will initiate such an event. Similarly, the event may be initiated upon the detection of a temperature change at the housing or in the ambient environment of a predetermined magnitude over a predetermined period of time. As another example, a pressure sensor may detect that a predetermined pressure in the high-pressure chamber 102 has been reached or that a predetermined pressure differential between the high-pressure chamber 102 and the low-pressure chamber 104 has been reached. Charging may be stopped when the battery 132 has been charged to a predetermined level. For example, a voltage sensor and detecting system may be used in conjunction with the controller system 130.

The battery 132 may be placed in a discharge condition for at least two purposes. One purpose is to provide electrical energy to an external load. The battery 132 may also be placed in a discharge condition for the purpose of providing current through and a voltage potential across the MEA so as to cause hydrogen to migrate from the low-pressure chamber 104 to the high-pressure chamber 102. This is in effect a "recharging" of the high-pressure chamber 102 with hydrogen. Discharge of battery 132 to recharge the hydrogen may be facilitated through use of sensor and detection systems in conjunction with the controller system 130. Battery discharge is terminated when a sufficient amount of hydrogen has been placed in or returned to the high-pressure chamber 102 and hydride bed 122. The "recharged" hydrogen condition in the high-pressure chamber 102 and associated hydride bed may be detected by a sensing mechanism that works in conjunction with the controller system 130 to recognize that sufficient hydrogen is now in the high-pressure chamber. For example, and not by way of limitation, a pressure sensor may detect that a predetermined hydrogen pressure has been achieved. As a further example, and also not by way of limitation, a charge sensor to integrate current during the charge period as a part of the controller system may detect and determine that that at least as many hydrogen ions as migrated from the high-pressure chamber to the low-pressure chamber during the battery 132 charging have been returned to the high-pressure chamber.

Figure 10:
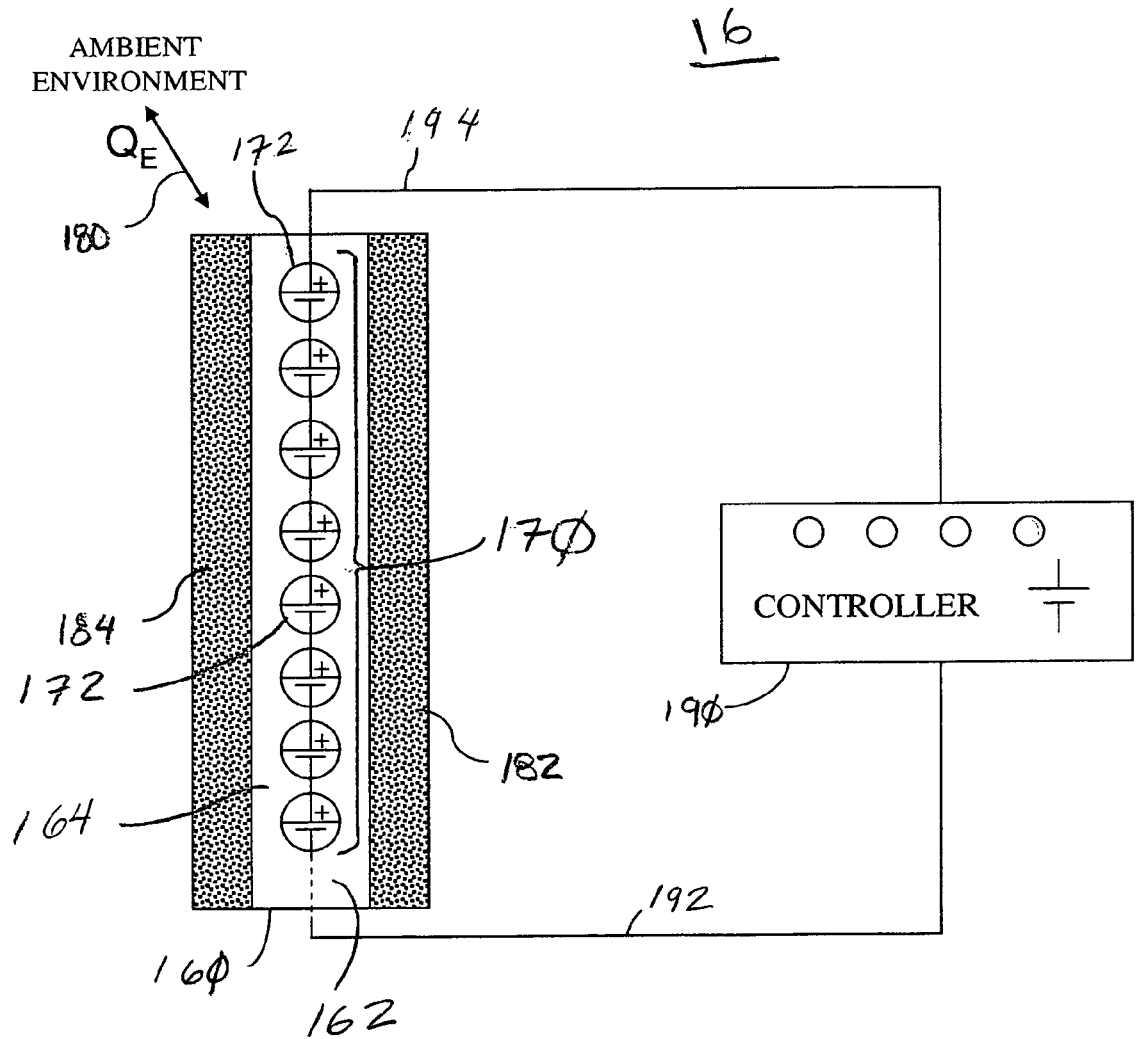
FIG. 10 is a schematic illustration of an electrochemical conversion system in accordance with an embodiment of the invention showing metal-hydride beds, MEA array or stack, battery integrated with controller system for dynamic operation over a range of mean temperatures.

Referring now to FIG. 10, an electrochemical conversion system 16 has several elements similar to the systems 10, 12, 14 previously illustrated and described herein. A thermally-conductive housing 160 defines an interior that is divided into a high-pressure chamber 162 and a low-pressure chamber 164 by a substantially gas-impermeable barrier that is formed at least in-part by an ionically-conductive, electrical-energy-generating mechanism. Ambient heat of the environment $Q_E$ and heat from within the housing 160 are interchangeable through the housing 160, as denoted by the bi-directional arrow 180. A particularly suitable ionically-conductive, electrical-energy-generating mechanism is at least one membrane-electrode assembly (MEA) type of electrochemical cell. The MEA and constituent elements described previously herein are also suitable for use in the embodiment of FIG. 10. As before, the membrane of the MEA provides the substantially gas-impermeable barrier. The ionically-conductive, electrical-energy-generating mechanism comprises an MEA array, or stack 170. The array/stack 170 comprises individual MEA's electrically connected in series. As in the case of the embodiment of FIG. 14, for convenience, the illustration of FIG. 10 uses a graphic icon to represent MEA cells. The icon is denoted by the numeral 172 and consists of the symbol for a cell (positive and negative electrode) inscribed within a circle as a symbol for at least one MEA. The icon is used to represent one or a grouping of more than one MEA. Further, the grouping of the graphic MEA icons 172 is used herein to represent an array, or stack, 170 of individual MEA cells 172. A first hydrogen-storage medium, in the form of a high-pressure, metal-hydride bed 182 is disposed in the high-pressure chamber 162. A second hydrogen-storage medium, in the form of a low-pressure, metal-hydride bed 184, is disposed in the low-pressure chamber 164. Operation of the array, or stack, 170 is such that the hydrogen passes across all of the cells uniformly.

A charge controller system 190 includes a rechargeable battery, electrical circuit components, sensing components, switching components, battery and discharge charge circuitry, and software components including but not limited to pattern recognition software. Internal logic of the charge controller system 190 enables it to selectively extract power from the MEA array/stack 170 to charge the battery and/or to direct electrical power elsewhere or to supply power to the MEA array/stack 170 to regenerate the metal-hydride beds 182, 184. The pattern recognition software allows the charge controller system 190 to recognize patterns in temperature transients and hydrogen pressure transients and thereby anticipate peaks and ebbs in temperature so as to identify optimum times at which to initiate a battery charge or metal-hydride regeneration event. The battery charge circuitry allows the charge controller system 190 to operate efficiently over a wide range of MEA array open circuit voltages. As such it can perform a battery charge or hydride-bed regeneration event independent of the mean environmental temperature or associated mean operating voltage of the MEA array. This feature gives the engine the versatility to operate about a mean environmental temperature of 10° C., 40° C. or other mean that the environmental temperature may dictate.

Metal Hydrides' Role in Operation of Ambient-Heat Engine

Metal hydrides are metallic substances that are capable of absorbing hydrogen gas when exposed to the hydrogen gas at certain pressures and temperatures. The terminology used in discussing metal hydrides is sometimes confusing. A primary reason for the confusion is that the term metal hydride can be used to refer to the hydrogen-absorptive material both before and after it has absorbed hydrogen. Therefore, for purposes of explanation herein, the pre-absorption material generally will be referred to as "metal hydride" or "metal-hydride material," or, simply, "hydride." After the metal hydride, or metal-hydride material, has absorbed hydrogen gas, for clarity, the resulting product sometimes is referred to herein as a hydrogen-ladened metal-hydride." The "hydrogen-ladened" adjective is not used where from the context the state or condition of hydrogen absorption is clear. In the hydrogen-ladened metal hydride, hydrogen is distributed throughout the metal-lattice structure of the metal hydride. The metal-hydride material is typically provided in a crushed or other configuration that maximizes the surface area to be contacted by hydrogen gas.

Ideally, if the pressure of the hydrogen gas rises above the equilibrium pressure, then hydrogen will be absorbed into the metal hydride. Absorption is exothermic since heat will be released during the process. If sufficient heat is not transferred away from the metal hydride to support continued hydrogen absorption at a stable temperature, then the temperature will increase to a point where a new, higher equilibrium pressure state is attained. On the other hand, if the pressure of hydrogen gas drops below the equilibrium pressure, hydrogen gas will be released from the hydrogen-ladened metal-hydride material. The hydrogen-release process is endothermic since heat input is required to maintain the desorption process. If sufficient heat is not available to support continued hydrogen evolution at a stable temperature, then the temperature will drop to a point where a new lower equilibrium pressure is attained. In practice, for a given material, the equilibrium pressures and temperatures for absorption are different from the equilibrium pressures and temperatures for desorption by finite amounts. This difference is generally referred to as the hysteresis property of the material and must be accounted for by appropriately selecting metal hydrides for use in the JAHE.

The ambient-heat engine 10, 12, 14, 16 operates cyclically and, as such, any point or region in the cycle that is illustrated in the temperature-entropy diagram of FIG. 8 can be chosen as a starting point. Certain conditions will exist in the engine at any one of the four points of the diagram. For example, consider the condition of an increasing environment temperature when the hydrogen gas that is used in the engine is predominantly contained in the high-pressure chamber. The temperature transient of the high-pressure hydrogen terminates at point "1" on the diagram. As previously discussed herein, the metal-hydride materials are chosen such that at any given temperature, the midpoint equilibrium pressure in the high-pressure chamber 22, 62, 102, 162 will be greater than the midpoint equilibrium pressure in the low-pressure chamber 24, 64, 104, 164. As the ambient temperature increases, the equilibrium pressures of both metal-hydride beds 42/44, 82/84, 122/124, 182/184 of each engine 10, 12, 14, 16 respectively increase.

Phase 1-2: The portion of the cycle of FIG. 8 from point 1 to point 2 represents, the expansion of hydrogen from the high-pressure chamber 22, 62, 102, 162 and passage of the hydrogen from the high-pressure chamber to the low-pressure chamber 44, 64, 104, 164. Electrical energy is generated during this portion of the cycle. Several things occur simultaneously, in Phase 1-2. Heat is absorbed in the high-pressure chamber as hydrogen is released and heat is released by the low-pressure chamber as the metal hydride contained therein absorbs hydrogen. The engine may be configured to facilitate heat transfer between the two chambers so as to minimize the amount of heat that must be extracted from or transferred to the environment. However, the overall effect of expansion of hydrogen from the high-pressure bed to the low-pressure bed is endothermic due to the net decrease in energy state of the hydrogen and heat is absorbed by the engine from the elevated temperature ambient environment. The transition of the hydrogen from state 1 to state 2 is associated with the closing of a circuit that includes the ionically-conductive membrane and the electrical-energy storage device. With closing of the circuit hydrogen ions $H^+$ are conducted across the membrane and electrons freed from the hydrogen flow through the circuit into the electrical-energy storage device. During Phase 1-2, hydrogen (that has been reconstituted from migrated hydrogen ions H+ and received electrons) is received in the opposing low-pressure chamber 24, 64, 2104, 164 where it is ready to be absorbed into the associated metal-hydride beds 44, 84, 124, 184.

Phase 2-3: With the hydrogen now substantially contained by the low-pressure metal-hydride chamber 24, 64, 104, 164, the portion of the cycle of FIG. 8 from point 2 to point 3 represents a decreasing temperature transient (which may be a succession of decreasing temperature transients) associated with the engine's environment. Note that at point 2, the temperature of each metal-hydride bed has been substantially stabilized to the high temperature ($T_{HT}$) of the ambient environment. Between points 2 and 3, as ambient environment temperature decreases, heat is transferred through the housing 20, 60, 100, 160 of the engine 10, 12, 14, 16 to what is now a low-temperature ambient environment ($Q_{LT}$, $Q_E$) causing both the temperature and the equilibrium pressures of the metal-hydride beds 42/44, 82/84, 122/124, 182/184 of each engine 10, 12, 14, 16 respectively to decrease. Phase 2-3 may be considered to be carried out under the constant volume of the low-pressure chamber 24, 64, 104, 164.

At point 3, the predominance of hydrogen in the engine system is in the low-pressure chamber 24, 64, 104, 164 and in equilibrium with the low-temperature point of the ambient environment, $T_{LT}$.

Phase 3-4: During this phase of the cycle of FIG. 8 represented by point 3 to point 4, the high-pressure chamber 22, 62, 102, 162 of the engine system is "recharged" with hydrogen. The electrical-energy storage device is energized to complete a circuit (that includes the MEA 30, 70, 116, 170) and thereby cause hydrogen ($H_2$) to be conducted through the MEA as hydrogen ions ($H^+$) from low-pressure chambers 24, 64, 104, 164 to high-pressure chambers 22, 62, 102, 162 respectively. The MEA performs a pumping process to recompress the hydrogen. At point 4 of the diagram of FIG. 8, hydrogen predominantly has been aggregated in the high-pressure chamber under some pressure. Electrical energy is consumed during this portion of the cycle. Heat is absorbed in the low-pressure chamber as hydrogen is released and heat is released by the high-pressure chamber as the metal hydride contained therein absorbs hydrogen. The overall effect of compression of hydrogen from the low-pressure bed to the high-pressure bed is exothermic due to the net increase in energy state of the hydrogen and heat is released by the engine to the now lower temperature ambient environment.

Phase 4-1: The portion of the cycle of FIG. 8 from point 4 to point 1 represents an increasing temperature transient (which may include a succession of lesser increasing temperature transients). Note that at point 4 hydrogen has been aggregated in the high-pressure chamber 22, 62, 102, 162. As ambient environment temperature increases, heat is transferred through the housing 20, 60, 100, 160 of the engine 10, 12, 14, 16 causing both the temperature and equilibrium pressures of the metal-hydride beds to increase, with the high-pressure bed maintaining a higher equilibrium pressure than that of the low pressure bed.

Additional Features of the Invention

In a broad embodiment, the invention is practiced without first and second hydrogen-storage mediums, and more particularly, without metal-hydride materials. In this embodiment, at least a first portion of the hydrogen that is placed in the housing is initially placed in the high-pressure chamber at a higher pressure than a second quantity of hydrogen that is initially placed in the low-pressure chamber. The invention still operates by the previously-described mechanism of selecting between a charge condition and a discharge condition. The addition of hydrogen-storage mediums such as metal hydrides increases the amount of hydrogen that can be stored at a given pressure in a given volume and therefore the amount of electronic charge that can be produced.

A capacitor may be used instead of a battery as an electrical-energy-storage device that can be successively charged and discharged.

Each electrode may include a porous current collector to help facilitate the flow of hydrogen and hydrogen ions while still conducting a flow of electrons.

Each electrode may include a catalyst such as platinum to help facilitate the hydrogen reaction at each respective electrode.

Many variations and modifications may be made to the above-described embodiments without departing from the scope of the claims. All such modifications, combinations, and variations are included herein by the scope of this disclosure and the following claims.

The invention claimed is:

1. A method for generating electrical energy comprising:
providing an electrochemical conversion system comprising:
a housing comprising a substantially gas-impermeable barrier dividing an interior of the housing into a high-pressure chamber and a low-pressure chamber, at least a portion of the substantially gas-impermeable barrier comprising an electrical-energy-generating mechanism, a quantity of hydrogen being disposed within the housing in at least the high-pressure chamber,
an electrical-energy storage device connected to the electrical-energy-generating mechanism, the electrical-energy storage device being selectively operable between a charge condition and a discharge condition, and
a controller system coupled to the electrical-energy generating mechanism and the electrical-energy storage device, the controller system being configured to selectively place the electrical-energy storage device in one of the charge condition and the discharge condition; and
coupling energy between the electrical-energy-generating mechanism and the electrical-energy storage device by the controller system to selectively place the electrical-energy storage device in one of the charge condition and the discharge condition upon detection of a substantial termination in a temperature transient of at least a first predetermined minimum magnitude over a first predetermined period of time,
wherein the electrical-energy storage device is charged at a first temperature and a first voltage by expansion of the hydrogen and discharged at a second temperature and a second voltage by compression of the hydrogen, the second voltage being different from the first voltage, a difference in energy produced during the expansion of the hydrogen at the first temperature and energy required for the compression of hydrogen at the second temperature being the generated electrical energy.

2. The method of claim 1, wherein the first and second temperatures are ambient temperatures.

3. The method of claim 1, wherein the temperature transient is naturally occurring in an ambient environment of the electrochemical conversion system.

4. The method of claim 1, wherein the electrochemical conversion system further comprises a housing comprising a substantially thermally-conductive material defining the interior,
the electrical-energy-generating mechanism being ionically-conductive,
wherein when the electrical-energy storage device is charged, hydrogen molecules within the high-pressure chamber are converted to hydrogen ions and conducted through the substantially gas-impermeable, ionically-conductive electrical-energy-generating mechanism to the low-pressure chamber causing electrical energy to be generated to the electrical-energy storage device, and
wherein when the electrical-energy storage device is discharged, an electric current is passed through the substantially gas-impermeable, ionically-conductive electrical-energy-generating mechanism causing hydrogen in the low-pressure chamber to convert to hydrogen ions and conduct through the substantially gas-impermeable, ionically-conductive electrical-energy-generating mechanism to the high-pressure chamber.

5. The method of claim 4, wherein the electrochemical conversion system further comprises a first hydrogen-storage medium disposed within the high-pressure chamber and a second hydrogen-storage medium disposed within the low-pressure chamber,
wherein at any given temperature the first hydrogen-storage medium stores hydrogen at a first average storage pressure that is higher than a second average storage pressure at which the second hydrogen-storage medium stores hydrogen.

6. The method of claim 5, further comprising aggregating at least a first portion of the quantity of hydrogen in the high-pressure chamber in a pressurized condition at a higher pressure than a second portion of the quantity of hydrogen disposed in the low-pressure chamber.

7. The method of claim 6, wherein the step of aggregating the hydrogen in the high-pressure chamber in a pressurized condition comprises aggregating the hydrogen in the high-pressure chamber manually.

8. The method of claim 6, wherein the step of aggregating the hydrogen in the high-pressure chamber in a pressurized condition comprises applying a voltage potential across the ionically-conductive, electrical-energy-generating mechanism so as to cause hydrogen ions to migrate therethrough from the low-pressure chamber to the high-pressure chamber.

9. The method of claim 1, further comprising the step of terminating charging of the electrical-energy storage device when the electrical-energy storage device has been charged to predetermined electrical parameters including potential.

10. The method of claim 9, wherein the electrical-energy storage device is discharged when a decrease in temperature of at least the first predetermined minimum magnitude has been detected.

11. The method of claim 1, further comprising the step of terminating discharging of the electrical-energy storage device when a predetermined amount of hydrogen has migrated from the low-pressure chamber to the high-pressure chamber.

12. The method of claim 11, further comprising the step of terminating discharging of the electrical-energy storage device when a predetermined hydrogen pressure has been detected in the high-pressure chamber.

* * * * *